(12) United States Patent
Sweeney et al.

(10) Patent No.: US 6,722,426 B2
(45) Date of Patent: Apr. 20, 2004

(54) GASKET WITH MULTIPLE SEALING SURFACES

(75) Inventors: Thomas F. Sweeney, deceased, late of San Diego, CA (US), by Lexie Sweeney, executrix; Norman Brammer, Aberdeen (GB); George Chalmers, Peterhead (GB)

(73) Assignee: ABB Vetco Gray Inc., Houston, TX (US)

( * ) Notice: Subject to any disclaimer, the term of this patent is extended or adjusted under 35 U.S.C. 154(b) by 4 days.

(21) Appl. No.: 10/184,469

(22) Filed: Jun. 27, 2002

(65) Prior Publication Data

US 2003/0000694 A1 Jan. 2, 2003

Related U.S. Application Data

(60) Provisional application No. 60/302,162, filed on Jun. 29, 2001.

(51) Int. Cl.⁷ ............................................. E21B 33/10
(52) U.S. Cl. ................... 166/115; 277/644; 285/334.2; 166/82.1
(58) Field of Search ................... 277/328, 329, 277/607, 626, 644; 285/334.2; 166/379, 82.1, 115

(56) References Cited

U.S. PATENT DOCUMENTS

| | | | | |
|---|---|---|---|---|
| 3,507,506 A | * | 4/1970 | Tillman, III | 277/614 |
| 3,749,426 A | * | 7/1973 | Tillman, III | 285/336 |
| 3,873,105 A | * | 3/1975 | Wehner | 277/322 |
| 5,039,140 A | * | 8/1991 | Szymczak | 285/334.2 |
| 5,103,915 A | | 4/1992 | Sweeney et al. | |
| 5,149,148 A | * | 9/1992 | Taeuber et al. | 285/276 |
| 5,624,124 A | * | 4/1997 | Ungchusri et al. | 277/607 |
| 5,709,936 A | * | 1/1998 | Besmann et al. | 428/323 |
| 6,007,111 A | * | 12/1999 | Wafer | 285/334.2 |
| 6,070,912 A | * | 6/2000 | Latham | 285/61 |
| 6,409,176 B2 | * | 6/2002 | Allen | 277/340 |
| 6,450,507 B2 | * | 9/2002 | Johnson | 277/612 |
| 6,561,521 B2 | * | 5/2003 | Janoff et al. | 277/603 |

FOREIGN PATENT DOCUMENTS

| | | |
|---|---|---|
| GB | 2156918 A | 10/1985 |
| GB | 2363829 A | 1/2002 |

* cited by examiner

*Primary Examiner*—David Bagnell
*Assistant Examiner*—Daniel P Stephenson
(74) *Attorney, Agent, or Firm*—Bracewell & Patterson, L.L.P.

(57) ABSTRACT

A metal seal for a wellhead assembly has upper and lower legs extending in opposite directions from each other and a rib extending radially outward from a junction of the legs. A first conical band on the upper leg extends uninterrupted from the rib a selected distance toward a tip of the upper leg. A second conical band on the upper leg extends uninterrupted from the tip of the upper leg toward the first conical band. An annular recess is located between the first and second conical bands. The lower leg also has two conical seal bands separated by a recess.

24 Claims, 3 Drawing Sheets

6,722,426 B2

GASKET WITH MULTIPLE SEALING SURFACES

This application claims priority from the U.S. provisional application Ser. No. 60/302,162. filed Jun. 29, 2001 entitled "Gasket with Multiple Sealing Surfaces".

TECHNICAL FIELD

The present invention relates in general to metal-to-metal seals, and in particular to an improved gasket for sealing between a wellhead housing and a wellhead connector.

DESCRIPTION OF THE PRIOR ART

In oil and gas wellhead assemblies, tubular members are connected end-to-endand sealed by a gasket or seal ring. One type of seal ring, particularly used in subsea wellhead assemblies, is of metal and has upper and lower legs. A rib extends radially outward from a junction of the legs. Each leg has a conical sealing surface that engages a conical seat on one of the wellhead members. The conical sealing surface is a continuous cone that extends from the tip of the leg to the rib. The taper angle of the sealing surface is typically slightly different that the taper angle of the seat, creating an interference metal-to-metal sealing engagement. A coating, such as a silver alloy, may be applied to the sealing surface to enhance sealing.

This type of seal works well. However, improvements are desired in the ability of the seal to seal against high pressure gas over long periods of time.

SUMMARY OF THE INVENTION

The seal of this invention has two oppositely extending legs and a rib extending radially from the junction of the legs. A pair of sealing bands are located on at least one of the legs. The sealing bands are separated by an annular recess. One of the sealing bands extends from the tip of the leg to the recess. The other extends from the rib to the recess.

Preferably, the bands are located in the same conical surface of revolution. The taper angle is slightly smaller relative to the axis of the seal ring, than the seat. This causes greater contact pressure in the sealing band located adjacent the tip than the one next to the rib. A coating of molybdenum sulfide is applied to the sealing bands in the preferred embodiment. The recess has tapered upper and lower edges, and in the preferred embodiment, has a concave base.

Preferably, both legs are identical. However, one version of the seal has a contingent seal leg in the event the conical seat on the lower tubular member is damaged. The contingent seal leg has only a single sealing band, and it is located adjacent the tip and separated by as support section. The contingent seal band is at a much steeper angle, relative to the axis of the seal ring, than the two seal bands on the opposite leg.

DETAILED DESCRIPTION OF THE PREFERRED EMBODIMENT OF THE PRESENT INVENTION

Figure 1:
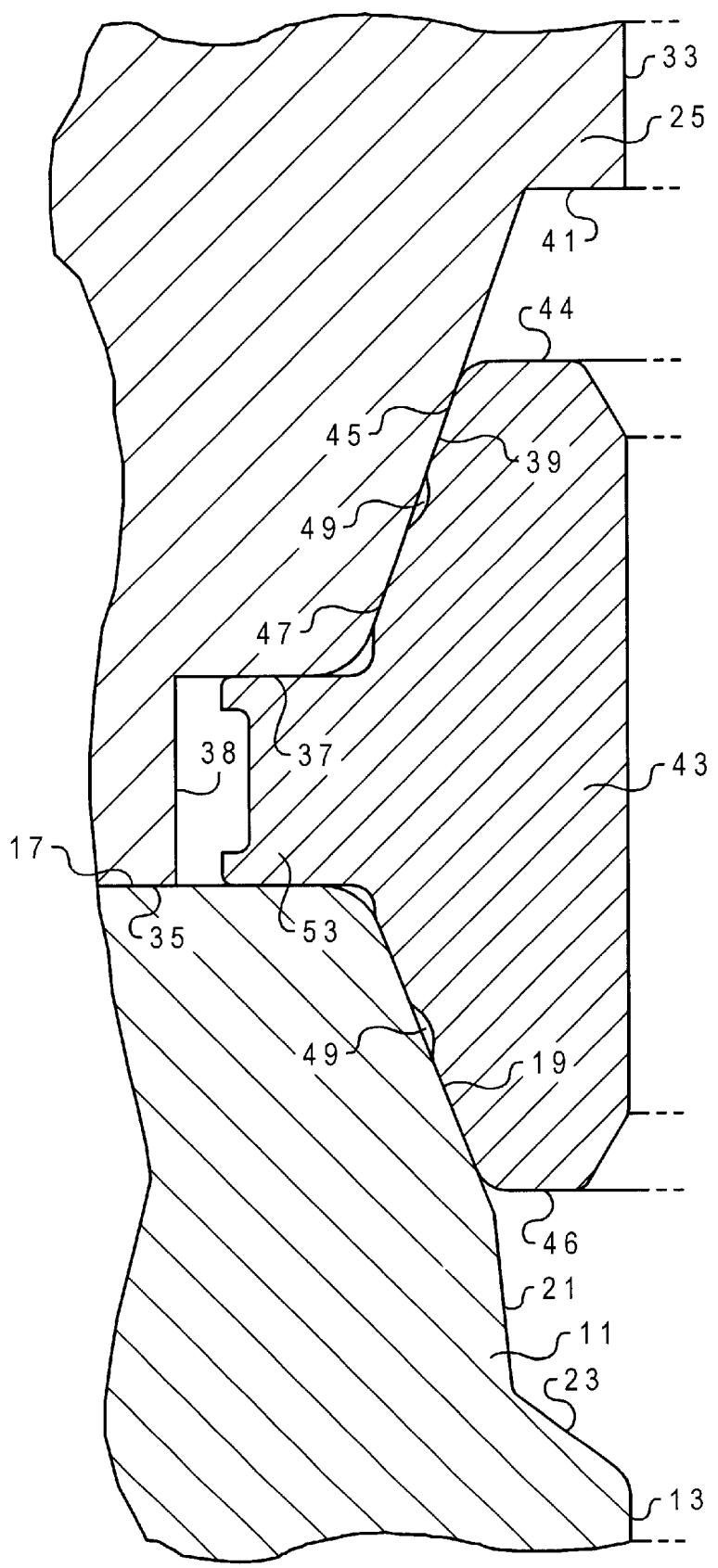
FIG. 1 is a sectional side view of a seal constructed in accordance with the present invention and shown installed between a wellhead housing and a wellhead connector.

Referring to FIG. 1, wellhead housing 11 has a bore 13 terminating on its upper end in a rim with an upward facing shoulder 17. A conical primary seat or sealing surface 19 extends downward and inward from shoulder17. Primary seal surface 19 has a lower marginal edge that joins a secondary seat or seal surface 21. Secondary seal surface 21 is preferably conical, also, but at a lesser angle relative to the axis of bore 13 than primary seal surface 19. The lower marginal edge of secondary seal surface 21 joins a transition surface 23. The axial extent of secondary seal surface 21 is less than the axial extent of primary seal surface 19 in the preferred embodiment. Transition surface 23 is a conical surface with a lower edge that joins bore 13.

A wellhead connector 25 will connect to wellhead housing 11. Wellhead connector 25 has a lower portion that slides over the exterior of wellhead housing 11. Wellhead connector 25 has a locking member such as dogs (not shown) that are moved into engagement with grooves (not shown) formed on the exterior of wellhead housing 11. Wellhead connector 25 has a bore 33 that is coaxial with bore 13. A downward facing shoulder 35 of wellhead connector 25 contacts and bears against shoulder 17 of wellhead housing 11. A recess 37 is located radially inward from downward facing shoulder 35. Recess 37 has an outer wall 38 that is cylindrical and coaxial with wellhead connector bore 33. A conical seat or sealing surface 39 extends upward and inward from recess 37. Conical surface 39 has an upper marginal edge that joins a transition shoulder 41. Transition shoulder 41 is perpendicular to the axis of bore 33.

A gasket or seal ring 43 locates between wellhead connector 25 and wellhead housing 11. Seal ring 43 is generally T-shaped, and in this embodiment has an upper end or leg 44 and a lower leg or end 46 that are symmetrical. Each portion has a first seal band 45 near one end and a second seal band 47 spaced from seal band 45 by a recess 49. A rib 53 extends radially outward on the exterior of seal ring 43. Rib 53 locates in recess 37, with the outer side of rib 53 located inward from recess outer wall 38.

Figure 3:
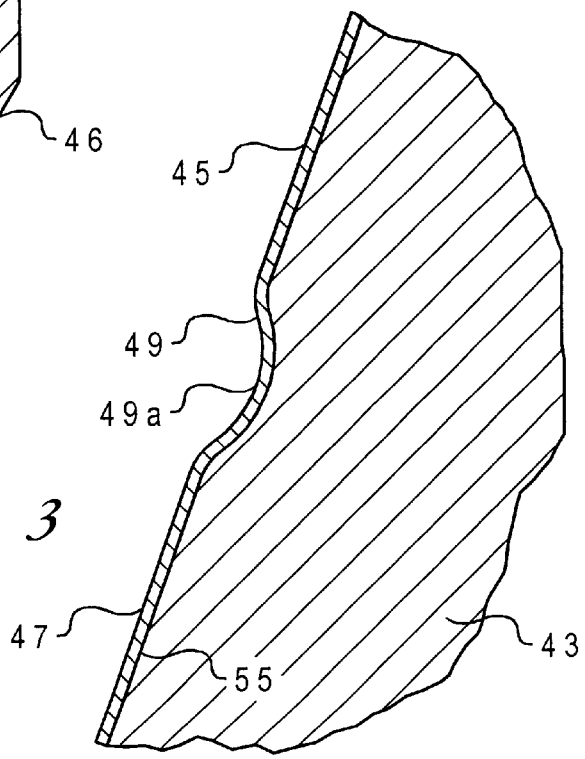
FIG. 3 is an a further enlarged sectional view of a portion of the seal of FIG. 1.

Each first seal band 45 extends from a tip of its seal leg 44 or 46 toward rib 53. Each second seal band 47 extends from rib 53 toward the tip of its seal leg 44 or 46. In the preferred embodiment, recess 49 is located midway between the tip of each leg 44 or 46 and rib 53. Each seal band 45, 47 is substantially the same width in this embodiment. Recess 49 has a width that is selected to increase the contact pressures of seal bands 45, 47 against their seats. However, the widths of the seal bands 45, 47 should be sufficiently large so as to avoid any leakage due to small scratches in the seal bands 45, 47 or seats that occur during installation. Preferably the width of each band 45, 47 is several times the width of recess 49. As shown in FIG. 3, preferably the upper and lower edges of recess 49 are tapered. Also, recess 49 is preferably a continuous curved surface, having a concave base 49a formed at a radius. Recess 49 is fairly shallow, having a depth that is less than its width.

Seal ring 43 is of metal and is constructed so that its seal bands 45, 47 interferingly engage conical surfaces 39 and 19. The interference causes elastic and permanent yielding when wellhead connector 25 connects to wellhead housing 11. The elastic yielding of seal ring 43 provides the necessary sealing between seal bands 45, 47 and conical seats 39 and 19.

Figure 2:
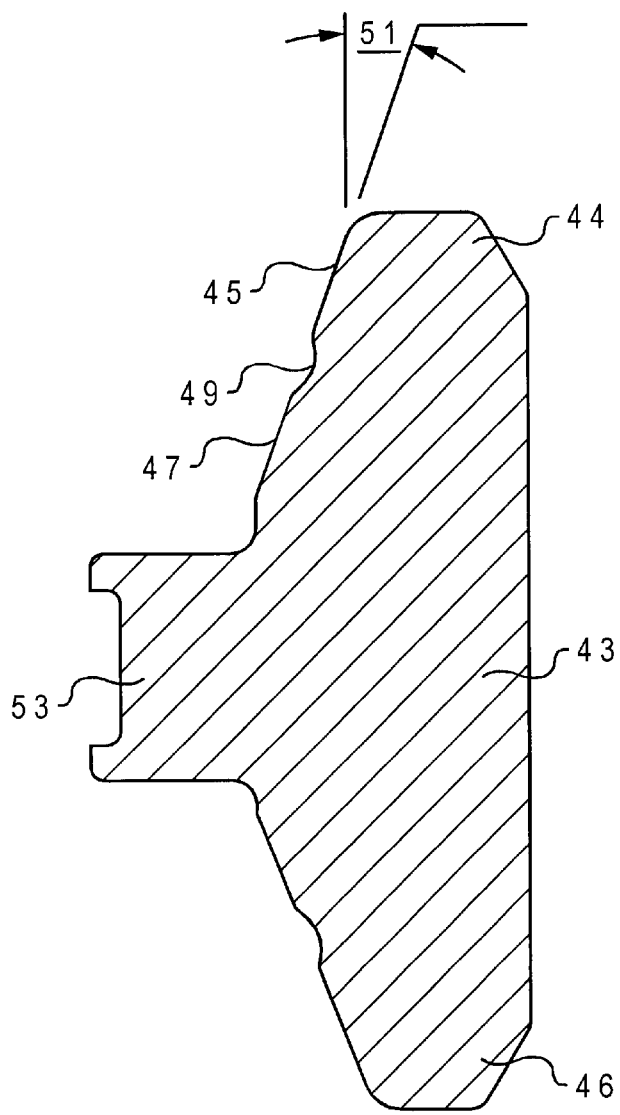
FIG. 2 is an enlarged sectional view of the seal of FIG. 1.

In the embodiments of FIGS. 1 and 2, each seal band 45, 47 is at the same conical angle relative to the axis of seal ring 43 and on the same conical surface of revolution. This conical angle, however, is preferably slightly different from the angle of its seat 39 or 19 so as to create more contact stress on the first conical band 45 than the second conical band 47. Referring to FIGS. 1 and 2, the angle 51 is smaller relative to the axis of seal ring 43 than the angles of seats 39 and 19 of wellhead members 25 and 11. Suitable angles 51 are in the range from 22 to 45 degrees.

Referring again to FIG. 3, the metal body of seal ring 45 is preferably of high strength metal, such as a stainless steel having a yield strength at least from 35 to 40 thousand pounds per square inch. A coating 55 is formed on seal bands 45, 47 to provide lubrication and prevent galling from occurring. Coating 55 is preferably molybdenum sulfide. In the preferred method, seal bands 45, 47 are finished to a high degree of smoothness, such as 8 RMS, then thoroughly cleaned. The molybdenum sulfide is coated on the smooth surface without abrasive blasting the underlying metal. This provides a very smooth surface finish.

Figure 4:
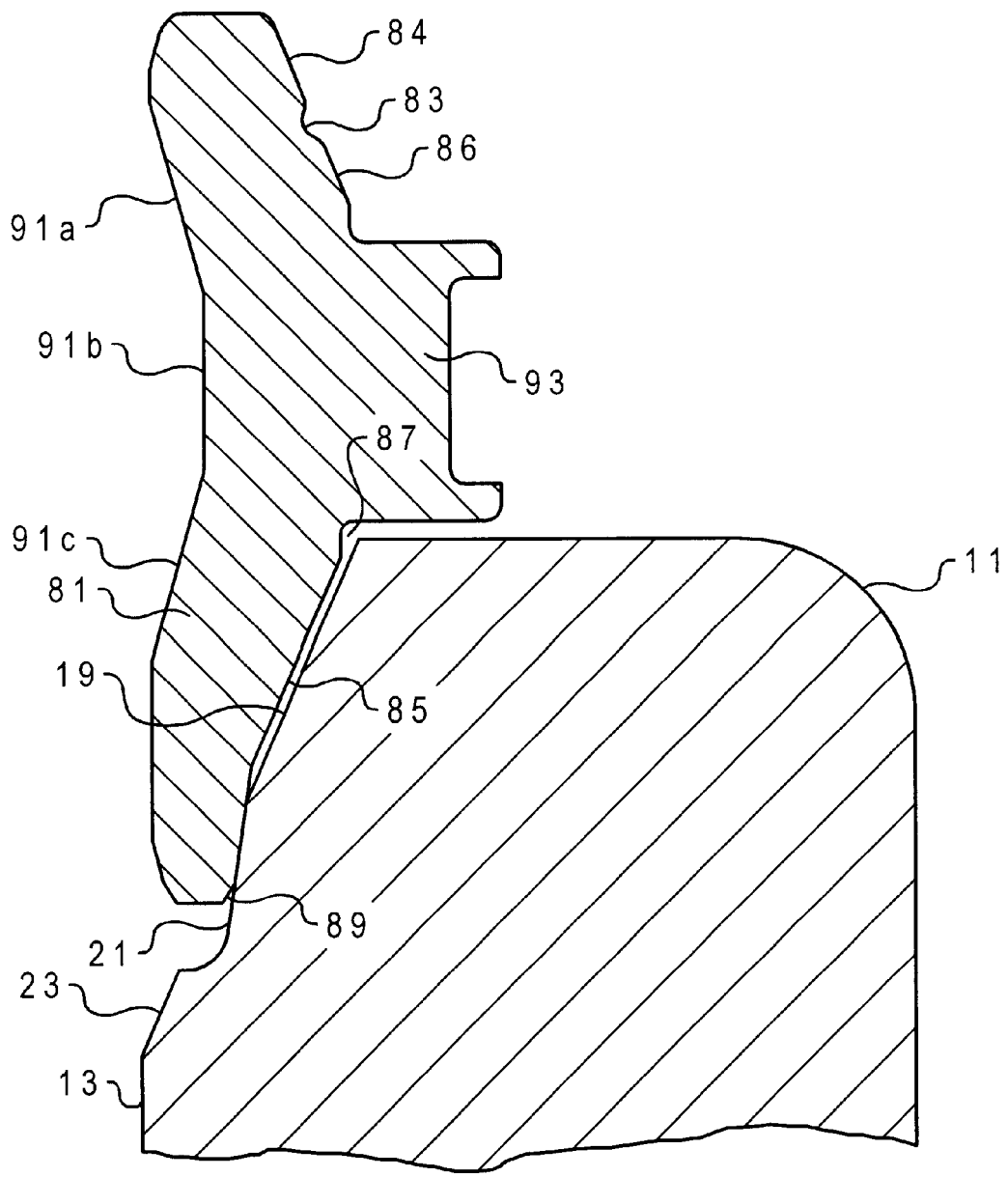
FIG. 4 is a sectional view of an emergency embodiment of the seal of FIG. 1.

FIG. 4 shows a contingent gasket 81 in the event that primary seal surface 19 of wellhead housing 11 becomes damaged. Seal ring 81 has an upper seal surface that is the same as in the other embodiments. It has a first seal band 84 and a second seal band 86 separated by a recess 83. The lower leg, however differs and may be constructed as shown in U.S. Pat. No. 5,103,915. The lower leg has a support section 85 that extends downward, overlying primary seal surface 19. Support section 85 is conical, at the same inclination as primary seal surface 19, however may be at a lesser dimension so that it does not touch. This results in a gap between support section 85 and the damaged primary sealing surface 19. Under load, a portion of support section 85 will deflect and touch primary seal surface 19, but not enough to cause sealing.

A lower seal surface 89 extends downward from support section 85. Lower seal surface 89 inclines relative to the axis of bore 13 at the same inclination as secondary seal surface 21. It is sized at a greater diameter so as to create an interference fit with secondary seal surface 21. Seal ring 81 has an inner diameter with an upper portion 91a that is conical and leads to a central portion 91b that is cylindrical. Central portion 91b leads to a lower portion 91c that is conical. Central portion 91b is of greater diameter than upper and lower portions 91a, 91c. This provides a recessed or concave inner diameter to assist in the flexibility of seal ring 81.

The invention has significant advantages. Tests have shown that a seal constructed as above was able to withstand more stringent pressure tests than prior art seals having only a single seal band and no recess. This is particularly important for deepwater subsea well installations.

While the invention has been shown in only two of its forms, it should be apparent to those skilled in the art that it is not so limited but is susceptible to various changes without departing from the scope of the invention. For example, although the discussion above deals with permanent or plastic deformation of the seal ring, it is also applicable to metal seal rings designed for elastic deformation.

We claim:

1. A metal seal, comprising:
   a ring having first and second legs extending in opposite directions and a rib extending radially outward from a junction of the legs;
   a sealing surface on an exterior portion of each of the legs;
   the sealing surface on the first leg being a pair of conical bands separated by a recess;
   wherein:
   a first one of the bands extends substantially from a tip of the first leg;
   a second one of the bands extends substantially from the rib; and
   each of the bands is inclined at the same conical angle, and the conical angle is selected to differ from a seat angle so as to cause greater contact pressure in the first one of the bands than the second one of the bands.

2. The seal according to claim 1, wherein the recess has upper and lower tapered edges.

3. The seal according to claim 1, wherein each of the bands has a width that is greater than a width of the recess.

4. The seal according to claim 1, wherein the sealing surface on the second leg comprises a contingent seal band extending from a tip of the second leg toward the rib and separated from the rib by a support surface that is at a substantially different angle relative to the contingent seal band.

5. The seal according to claim 1, further comprising a coating on each of the bands of molybdenum sulfide.

6. A metal seal, comprising:
   a ring having upper and lower legs extending in opposite directions from each other and a rib extending radially outward from a junction of the legs;
   a first conical band on the upper leg extending uninterrupted from the rib a selected distance toward a tip of the upper leg;
   a second conical band on the upper leg extending uninterrupted from the tip of the upper leg toward the first conical band;
   an annular recess located between the first and second conical bands; wherein:
   the first and second conical bands are located at the same conical angle in the same conical surface of revolution; and
   the conical angle is selected to differ from a seat angle so as to cause a greater contact pressure of the second conical band than the first conical band.

7. The seal according to claim 6, wherein a width of the recess is less than a width of the first conical band and less than a width of the second conical band.

8. The seal according to claim 6, wherein the recess has upper and lower tapered edges and a concave base.

9. The seal according to claim 6, wherein the lower leg has a contingent seal band extending from a tip of the lower leg toward the rib and separated from the rib by a support surface that is at a substantially different angle relative to the contingent seal band.

10. The seal according to claim 6, further comprising a coating on each of the bands of molybdenum sulfide.

11. The seal according to claim 6, further comprising:
    a third conical band on the lower leg extending uninterrupted from the rib a selected distance toward a tip of the lower leg;
    a fourth conical band on the lower leg extending uninterrupted from the tip of the lower leg toward the third conical band; and
    an annular recess located between the third and fourth conical bands.

12. A well assembly, comprising:
    an upper tubular member having a rim and a conical seat located on an inner surface of the rim;
    a lower tubular member having a rim and a conical seat located on an inner surface of the rim of the lower tubular member;
    a seal having an upper leg that has an outer sealing surface that seals against the seat of the upper tubular member, a lower leg that has an outer sealing surface that seals against the seat of the lower tubular member, and a rib that extends radially outward from a junction of the upper and lower legs;

each of the sealing surfaces comprising two conical bands separated by an annular recess, with one of the conical bands extending from a tip of the leg on which it is located toward the rib, and the other of the conical bands extending from the rib toward the tip of the leg on which it is located;

the recess being smaller in width than the conical bands and having tapered upper and lower edges;

the conical bands being at the same conical angle and in the same conical surface of revolution;

the conical angle of the conical bands being slightly smaller than a conical angle of each of the seats, relative to an axis of the tubular members, so as to cause a greater contact pressure with the conical band that begins at the tip than the conical band that begins at the rib.

13. The seal according to claim 12, further comprising a coating on each of the conical bands of molybdenum sulfide.

14. A well assembly, comprising:

a first tubular member having a rim and a seat located on an inner surface of the rim, the seat having a primary sealing surface that is located in a single conical surface of revolution;

a second tubular member having a rim and a seat located on an inner surface of the rim of the second tubular member;

a seal having first and second legs separated by a rib that extends radially outward from a junction of the first and second legs;

the first leg having on an outer side a pair of flat, conical bands separated by an annular recess, the bands of the first leg engaging the primary seal surface of the first tubular member; and the second leg having on an outer side a sealing surface that engages the seat of the second tubular member.

15. The well assembly according to claim 14, wherein the recess of the first leg is smaller in width than either of the bands.

16. The well assembly according to claim 14, wherein the band farthest from the rib has a conical angle that is slightly smaller than a conical angle of the primary sealing surface of the first tubular member.

17. The well assembly according to claim 14, wherein the bands of the first leg are at the same conical angle.

18. The well assembly according to claim 14, further comprising a coating on each of the bands of molybdenum sulfide.

19. The well assembly according to claim 14, wherein one of the bands extends substantially from a tip of the leg to the recess, and the other of the bands extends substantially from the rib to the recess.

20. A well assembly, comprising:

an upper tubular member having a rim and a seat located on an inner surface of the rim, the seat having a primary sealing surface that is located in a single conical surface of revolution;

a lower tubular member having a rim and a seat located on an inner surface of the rim of the lower tubular member, the seat of the lower tubular member having a primary sealing surface that is located in a single conical surface of revolution;

a seal having upper and lower legs separated by a rib that extends radially outward from a junction of the upper and lower legs; and each of the legs having on an outer side two flat, conical bands separated by an annular recess, one of the bands on each of the legs extending from the rib to the recess, the other of the bands on each of the legs extending from the recess to a tip of each of the legs, the bands of the upper leg engaging the primary sealing surface of the upper tubular member, the bands of the lower leg engaging the primary sealing surface of the lower tubular member.

21. The well assembly according to claim 20, wherein the recesses of each of the legs are smaller in width than either of the bands.

22. The well assembly according to claim 20, wherein the band farthest from the rib of the first leg has a conical angle that is slightly smaller than a conical angle of the primary sealing surface of the first tubular member, and the band farthest from the rib of the second leg has a conical angle that is slightly smaller than a conical angle of the primary sealing surface of the second tubular member, relative to an axis of the tubular members.

23. The well assembly according to claim 20, wherein the bands of the first leg are at the same conical angle, and the bands of the second leg are at the same conical angle.

24. The well assembly according to claim 20, further comprising a coating on each of the conical bands of molybdenum sulfide.

* * * * *